Figures 1, 5:
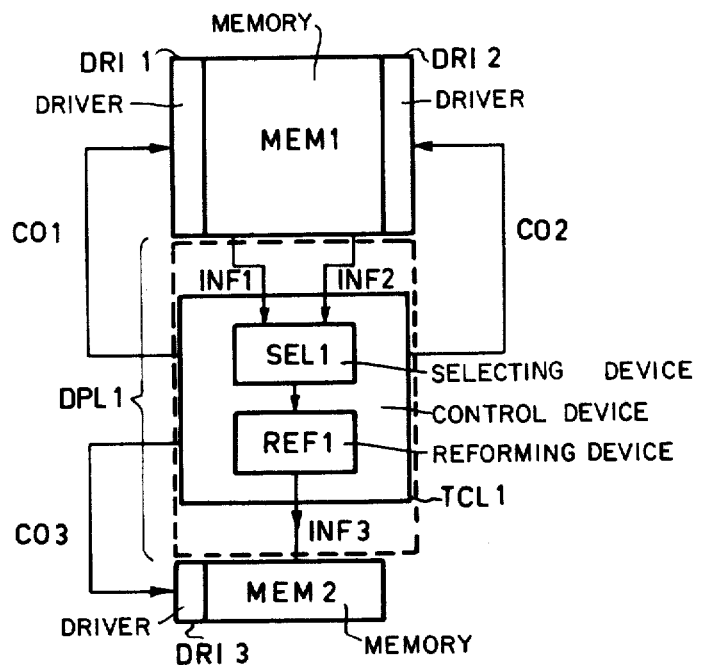

United States Patent [19]
Nyssens et al.

[11] B 3,984,811
[45] Oct. 5, 1976

[54] MEMORY SYSTEM WITH BYTEWISE DATA TRANSFER CONTROL

[75] Inventors: Philippe René Gabriel Nyssens, Brussels, Belgium; Johannes Bernardus Horsten, Eindhoven, Netherlands

[73] Assignee: U.S. Philips Corporation, New York, N.Y.

[22] Filed: June 25, 1974

[21] Appl. No.: 482,907

[44] Published under the second Trial Voluntary Protest Program on January 20, 1976 as document No. B 482,907.

[30] Foreign Application Priority Data
June 26, 1973 Belgium .............................. 132708

[52] U.S. Cl. ............................................. 340/172.5
[51] Int. Cl.² ........................................... G06F 3/00
[58] Field of Search ................................. 340/172.5

[56] References Cited
UNITED STATES PATENTS

| | | | |
|---|---|---|---|
| 3,351,909 | 11/1967 | Hummel | 340/172.5 |
| 3,417,375 | 12/1968 | Packard | 340/172.5 |
| 3,566,363 | 2/1971 | Driscoll, Jr. | 340/172.5 |
| 3,638,194 | 1/1972 | Matsushita et al. | 340/172.5 |
| 3,670,307 | 6/1972 | Arnold et al. | 340/172.5 |
| 3,705,388 | 12/1972 | Nishimoto | 340/172.5 |
| 3,710,349 | 1/1973 | Miwa et al. | 340/172.5 |
| 3,716,838 | 2/1973 | Beard | 340/172.5 |

FOREIGN PATENTS OR APPLICATIONS
1,097,230 United Kingdom

*Primary Examiner*—Edward J. Wise
*Attorney, Agent, or Firm*—Frank R. Trifari; Daniel R. McGlynn

[57] ABSTRACT

Memory system comprising a first memory and a second memory, in which memories a plurality of memory elements are arranged according to word locations and can be addressed by an address signal per word location, further comprising for each memory an instruction line for read and/or write instruction signals, driving devices and terminals in each memory which are interconnected by a data path line, and a control device capable of generating the instruction signals for addressing word location in the first memory for transferring information associated therewith as an information word via the data path line between the two memories.

11 Claims, 6 Drawing Figures

Fig. 4

| 1 | 2 | 3 | 4 | 5 | 6 | 7 | 8 | 9 | 10 |
|---|---|---|---|---|---|---|---|---|---|
| 1 | A B C D | – – – – | 3 0 0 | A B C D | 0 0 0 | 1 1 1 | 0 | A B C D | 1 1 1 |
| 2 | – A B C | – D – – | 3 1 0 | D A B C | 0 0 0 | 1 1 1 | 1 | A B C D | 1 1 1 |
| 3 | – – A – | B C D – | 3 3 0 | B C D A | 0 1 1 | 1 1 1 | 3 | A B C D | 1 1 1 |
| 4 | – – A – | B C D – | 3 3 1 | B C D A | 1 1 1 | 1 1 1 | 2 | D A B C | 1 1 1 |
| 5 | A B C – | – – – – | 2 0 1 | A B C – | 0 0 0 | 0 1 1 | –1 | – A B C | 0 0 1 |
| 6 | – A B – | – C – – | 2 2 0 | C – A B | 1 0 1 | 0 1 1 | 2 | – A B C | 1 1 0 |
| 7 | – – A – | – – – – | 1 0 2 | – A B – | 0 0 0 | 0 1 0 | (–)2 | – A B – | 0 0 1 |
| 8 | – A B – | – – – – | 1 2 2 | B – A – | 0 0 0 | 1 0 0 | 0 | – A B – | 0 0 1 |
| 9 | – – A – | – B – – | 1 3 0 | – B – A | 1 0 0 | 0 1 1 | 3 | A B – – | 1 1 0 |
| 10 | – A – – | – – – – | 0 1 2 | – – A – | 0 0 0 | 0 0 1 | –1 | – – A – | 0 0 1 |

MEMORY SYSTEM WITH BYTEWISE DATA TRANSFER CONTROL

The invention relates to a memory system which comprises a first and second memory, in which memories memory elements are arranged according to word locations and can be addressed at each word location by an address signal, an instruction line for read and/or write instruction signals for each memory, driving devices, terminals in each memory which are interconnected by a data path line, and a control device capable of generating the instruction signals for addressing word locations in the first memory in order to transfer information associated therewith in the form of an information word via the data path line between the said two memories. Such memory systems are frequently used. It is an object of the present invention to improve data transfer between two memories, particular attention being paid to the case in which the memory elements of a word location can be addressed in parallel. It is a further object of the invention to facilitate transfer of information words stored in word locations or parts of word locations via a multiple data path line with optimum utilisation of the width of the data path, i.e. the number of information elements, for example bits of arbitrary value, which can simultaneously be transferred. It is another object of the invention to perform the information transfer over a data path of given width as fast as possible. Furthermore the information can be transferred from the first memory to the second one or vice versa. To realise the above objects, the invention is characterized in that the said data path line includes a selection device capable of selecting a fraction of memory elements which by the said instruction signals are addressed in the first memory as entire word locations at two word locations simultaneously in order to enable an information word which is related thereto and can be built up from the selected information to be transferred whilst inhibiting the transfer of information elements related to the remaining memory elements which are addressed in this manner.

A somewhat similar memory system is described in United Kingdom Patent No. 1,097,230. The apparatus described in this application transfers data between memories having different word lengths. In the said apparatus storage capacity is saved in that in the memory having the larger word length the information words are stored in consecutive memory locations: thus an information word may be stored in two or more word locations but the transfer of an information word requires a number of machine cycles equal to the number of different word locations in a memory which can contain parts of one information word. The problem solved in the said patent application further relates to the conversion of the addresses of the word locations between which there is a one-to-one correspondence. The heart of the U.K. Patent No. 1,097,230 is that multiplication of addresses is performed. It further relates to memories of an arbitrary type, such as magnetic tape. The serial appearance of the data elements automatically renders a specific structure desirable. Building up an information word from information selected at different word locations and transfer of this information word in a single operation are not referred to at all in the said United Kingdom Patent No. 1,097,230.

It is frequently found necessary for the word information to be arranged in the memory in a fixed manner: for example in an arithmetical processor the least significant information bit must be located at a fixed bit location within the word, and thus consecutively. Advantageously this arrangement is effected automatically, that is, without specific commands given by the programmer writing instructions for the processor. In another memory, for example a backing memory, this is not always the case, for example because an operand forms part of a longer word. Furthermore instruction information may not be containable within one memory word: this makes it necessary to extract a part for use in the relevant operation. Thus there are instructions of longer or shorter information content.

A further advantage of the memory system according to the invention is that in this manner the width of the data path is fully utilized.

Advantageously, both memories are capable of storing in each word location an amount of information equal to that which can simultaneously be transferred through the data path line. This provides good matching, as the case may be for bidirectional transfer.

Advantageously the information word built up in this manner contains less information elements than can be stored in a word location in each memory. This enables many transfer modes to be realised with equal word lengths of the memories also.

Advantageously the memory elements selected for each word location by the selecting device are arranged consecutively within the word location. This simplifies the structure of the selection device.

A further simplification is obtained if at one word location so addressed the last memory element is selectable whilst at the other word location thus addressed the first memory element is selectable.

Further it is of advantage for the said selection device to have a rotator by which the information elements of the one word location the last memory element of which was selected can consecutively be transferred through the data path line as the highest-ranking ones whilst the information elements of the other addressed word location the first memory element of which was selected can consecutively be transferred through the data path line as the lowest-ranking ones. Such a rotator yields a highly logical structure.

Advantageously the said first memory comprises two modules and the two addressed word locations are alternately situated in either module. In this case the modules may be word-organized so that selection and addressing can more simply be performed.

It is a favourable aspect that the selecting device always operates on a fixed number of memory elements which are modularly arranged within the words and form bytes. Building up the information words from a small number of subwords enables the selection device to be simpler.

Another advantageous aspect is that two word locations can simultaneously be addressed by instruction signals in the second memory also, and that operation of the said selection device is bidirectional. This provides further flexibility with good matching of the memories.

Figure 2:
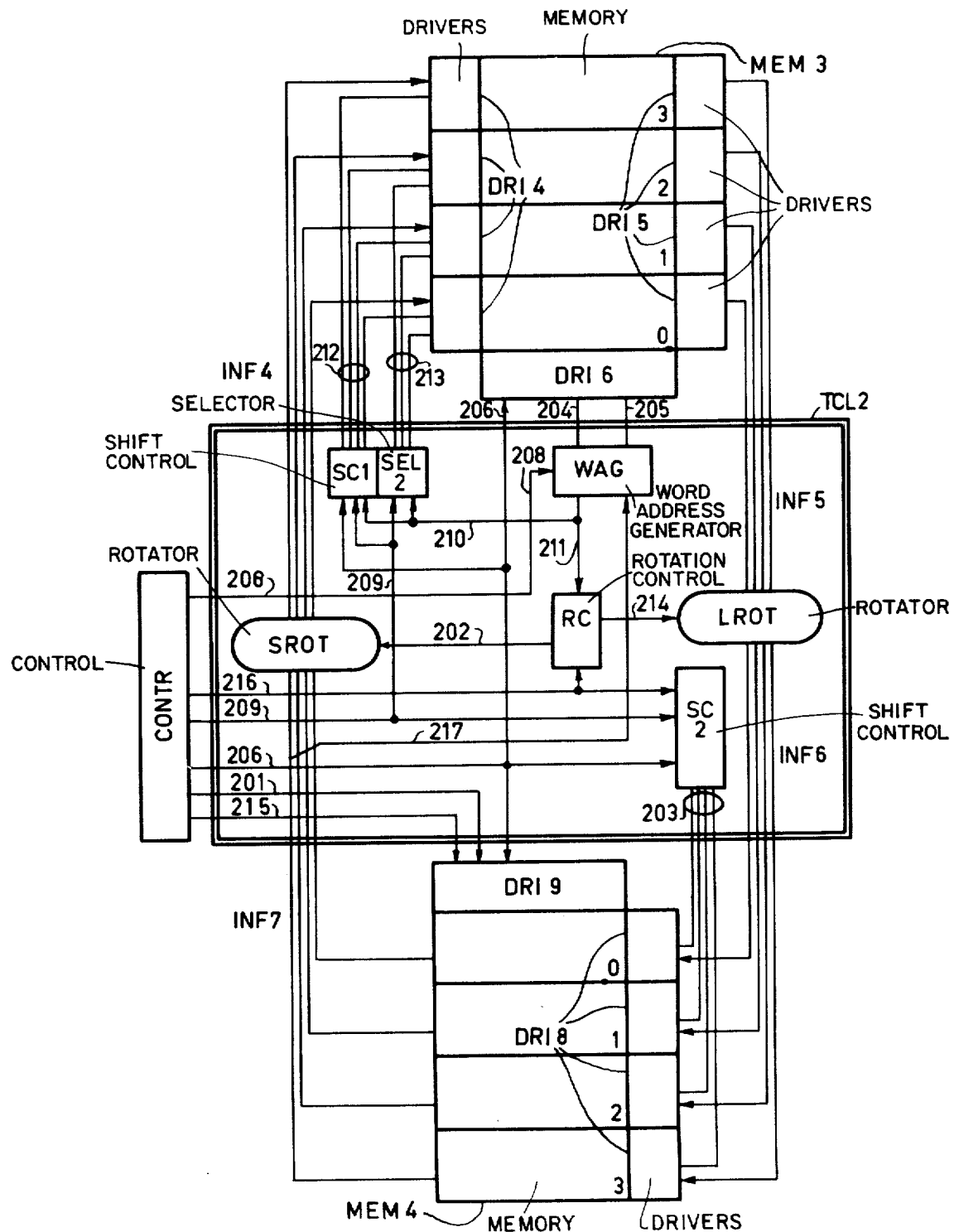
Figure 3:
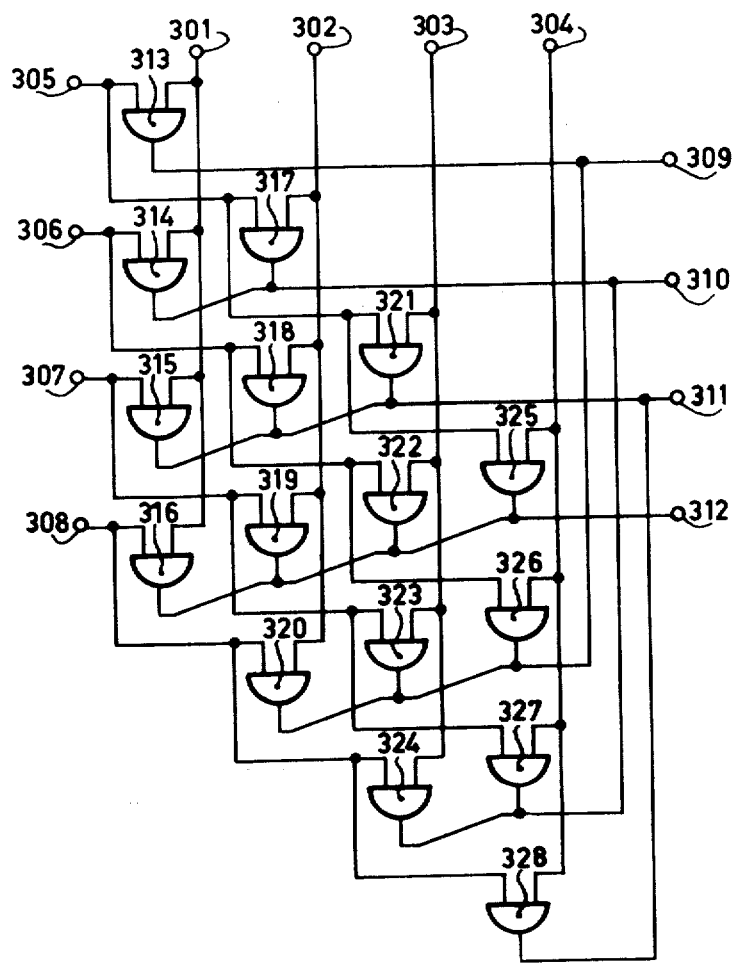
Figure 6:
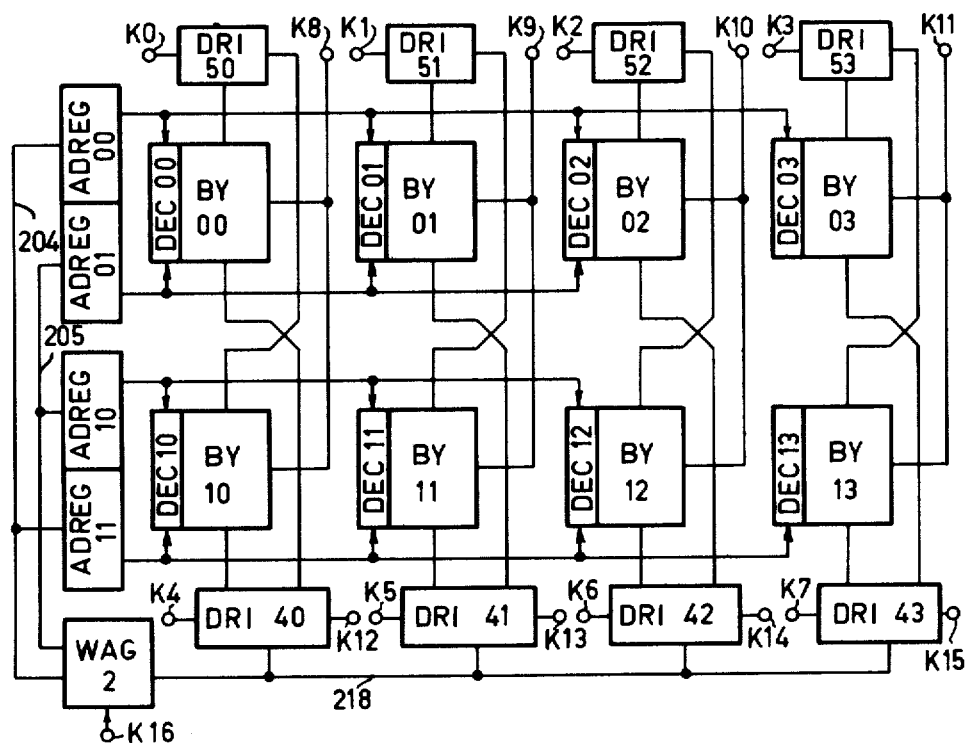

Embodiments of the invention will now be described, by way of example, with reference to the accompanying diagrammatic drawings, in which:

FIG. 1 is a schematic block diagram of a memory system according to the invention, FIG. 2 is a more elaborate block diagram of a memory system according to the invention, FIG. 3 is a circuit diagram of a rotator, FIG. 4 shows modes of the memory system according to FIG. 2, FIG. 5 is a Table of signals, and FIG. 6 is a more elaborate block diagram of part of the system of FIG. 2.

Referring now to FIG. 1, a memory system according to the invention comprises a first memory MEM 1, a second memory MEM 2, three instruction lines CO 1, CO 2 and CO 3, three driving devices DRI 1, DRI 2 and DRI 3, and a data path line DPL 1 which comprises three information lines INF 1, INF 2 and INF 3 and a control device TCL which includes a selecting device SEL 1 and a reforming device REF 1. Transfer of information is effected as follows. The memories MEM 1 and MEM 2 are word-organized and may be in the form of integrated circuits. When actuated by an external signal the control device TCL 1 delivers an instruction signal to the two driving devices DRI 1 and DRI 2 through instruction lines CO 1 and CO 2 respectively. The instruction signals in addition to further data contain address data so that they each enable an information word to be read out from a word location of the memory MEM 1 independently and simultaneously. The information elements of the said two words appear as information signals on the lines INF 1 and INF 2 of the data path line DPL 1 and reach the selecting device SEL 1 which selects part of the information elements and discards the remainder. The selected information elements are applied to the reforming device REF 1 which from them builds a new word which then is applied via the information line INF 3 to the second memory MEM 2 for storage. For this purpose the memory MEM 2 through the instruction line CO 3 receives a further instruction signal to be used by the driving device DRI 3. The latter instruction signal again includes amongst other data address data so that a word location can be selected in the memory MEM 2 for writing the information word received. The information lines INF 1, INF 2 and INF 3 may each comprise, for example, 32 lines in parallel which each serve to transfer one binary information element. (Owing to the invention the transfer rate of significant information is doubled without the line INF 3 having to be doubled.) In this embodiment two words are read, after which a selection is made from these words. Advantageously the read and select operations are not separated geographically, as will be described hereinafter. The lines INF 1, 2 then may have vanished as separate elements, selection being performed within the memory MEM 2. And yet the transfer rate is doubled in this manner. On the other hand, selection and reforming may alternatively be performed in the memory MEM 1.

FIG. 2 shows a more elaborate block diagram of a memory system according to the invention which comprises: two memories MEM 3 and MEM 4 having driving devices DRI 4, DRI 6 and DRI 8, DRI 9 respectively, a read amplifier arrangement DRI 5, a control device CONTR and a data path line which connects the memories to one another and comprises information lines INF 4, INF 5, INF 6 and INF 7 and a control device TCL 2 comprising rotators LROT and SROT, a rotation control RC, a word address generator WAG, shift controls SC 1 and SC 2 and a selector SEL 2. Furthermore there are numbered control lines.

The memories MEM 3 and MEM 4 are organized according to bytes, the memory elements of a byte location jointly being selected or not selected to write in or read out an information byte (for example 8 bits). The memories each are divided in four areas numbered 0 to 3 to indicate that a word location comprises four byte locations. The memory MEM 3 is a main memory which is large and frequently is slow and in which the information of an information word need not be stored altogether at one word location. The memory MEM 4 is a memory which is associated with an arithmetic unit, is smaller and frequently is comparatively fast and in which byte locations forming part of one word location can be jointly addressed. Hereinafter "reading" will first be considered: the information is transferred from the memory MEM 3 to the memory MEM 4. Afterwards, "writing" will be discussed.

The control device CONTR transmits the operand address to the word address generator WAG via a line 208. The operand address in the memory MEM 3 is a byte location address. From this address the word address generator WAG extracts the two least significant bits, which form the byte location number of the most significant information byte of the information word to be read, and supplies them via the lines 210 and 211 to the shift control SC 1, the rotation control RC and the selector SEL 2. Furthermore the word address generator WAG extracts the word location address from the byte location address, increases it by 1 and transmits the word location address via a line 204, and the word location address increased by 1 via a line 205, to the driving device DRI 6.

Thus it is known that a read-out operation is to be performed and also at which word locations it is to be performed. Simultaneously the control device CONTR via a line 206 transmits an instruction signal which indicates that the read-out operation is to take place in the memory MEM 3. The said signals reach the driving device DRI 6 and the shift controls SC 1 and SC 2. In addition, the control device CONTR via a line 209 supplies two bits of information to the selector SEL 2 and to the shift controls SC 1 and SC 2. These two bits indicate the number of bytes of the information word to be read out from the memory MEM 3. The shift control SC 1 is connected to the lines 206, 209 and 210 and the selector SEL 2 is connected to the lines 209 and 210. The shift control SC 1 is connected to the modules 0 to 3 of the memory MEM 3, whilst the selector SEL 2 is connected to the modules 0 to 2. A signal at an output line 212 of the shift control SC 1 indicates that the module connected to the relevant output can be read out; in the absence of such signal read-out from the relevant module is inhibited. A signal on one of lines 213 indicates that in the module connected to it the word location indicated by the signal on the line 205 can be read out. In the absence of such signal the word location indicated by the signal on the line 204 can be read out. The latter always is the case with respect to the module 3. FIG. 5 shows for the various signal combinations on the lines 209 and 210 for each module 0 ... 3 whether the said signals are present (1) or absent (0) on the lines 212 and 213. An asterisk indicates that it is not of importance whether a given signal is present or absent, for it is inoperative in any case. In the case of an information word length of for example three bytes, the most significant of which has the byte location number 2 (sixth column in FIG. 5) the signals on the lines 212 enable the byte location numbers 2, 3 and 0. The signal on the lines 213 selects the lowest word address location of the byte location having the byte location number 2; this always is the case with respect to the byte location number 3, whilst of the byte location number 0 the next higher word address location is selected. The byte location 1 is inhibited and selection is not of importance.

After completion of the read operation, which for that matter is performed in known manner, the information elements read out appear via the lines INF 5 at the rotator LROT. Via a line 216 the control device CONTR transmits two bits of information to the rotation control RC, which bits form the new byte location number of the most significant byte in the memory MEM 4. In the rotation control RC the rotation vector is determined as the difference of the byte location numbers applied via the lines 216 and 211. The device DRI 5 may include read amplifiers.

FIG. 3 is a circuit diagram of a rotator, for example the rotator LROT of FIG. 2, for four bits. The rotator has four information input terminals 301 ... 304, four control input terminals 305 ... 308, four information output terminals 309 ... 312 and sixteen logic AND gates 313 ... 328. When the control input terminal 305 is high ("1") the gates 313, 317, 321 and 325 are enabled: the logical "1" signals at the information input terminals 301, 302, 303 and 304 are conveyed to the information output terminals 309, 310, 311 and 312 respectively, and the rotation vector is 0. If, for example, the terminal 307 is logically "1", the logical "1" signals at the information input terminals are conveyed to the information output terminals 311, 312, 309 and 310, respectively. The rotation vector then is 2. If each byte comprises eight bits, the rotator comprises eight devices of the type shown in FIG. 3. If the number of bytes is greater, the number of gates 313 ... 328 increases in square relationship.

Thus the information to be written in the memory MEM 4 is applied to the driving devices DRI 8 via the lines INF 6. The shift control SC 2 is connected to the driving device DRI 8 via a line 203. If on one of the, in this case four, conductors of the line 203 a signal is present, writing the information supplied via the lines INF 6 into the byte location connected to the said conductor becomes possible. If the relevant signal is absent, writing is inhibited. The shift control SC 2 receives control signals via lines 206 (which indicates that a write operation in the memory MEM 4 is concerned), 209 (which indicates the number of bytes of the information) and 216 (which indicates the byte location number of the first byte). The Table of FIG. 5 shows the signals which in this case are to be generated by the shift control SC 2 is the following changes are made: 209 remains 209; 210 becomes 216, 212 becomes 203; 213 is omitted, because in this example only one word location in the memory MEM is selected. The address of the word location into which the information is to be written in the memory MEM 4 appears on a line 215. Thus this line 215 and the driving device DRI 9 to which it is connected perform a function which corresponds to the function fulfilled by the lines 204 and 205 and the driving device DRI 6 with respect to the memory MEM 3. The driving device DRI 9 further receives a signal from the line 206, so that the transfer direction of the information is known. Under the control of the signals on the lines 203, 206 and 215 the information is written into the memory MEM 4 in an otherwise known manner.

In certain cases it is not necessary for the shift control SC 2 to receive the information via the line 216, namely in the cases in which the least significant information byte invariably is to be stored by the byte location having the same byte location number (for example number 3). In such cases only the 4th, 7th, 10th and 13th column of FIG. 5 are of importance. When writing into the memory MEM 4, for example immediately after the new word has been written in, the information as to from which location of the memory MEM 3 the said information originates is also written into the memory MEM 4. This may be effected in that the control device CONTR increases the word location number on the line 215 by 1 and writes the address of this information into the memory MEM 3 via a line 201. Thus this information provides the byte location number of the most significant information byte and corresponds to the information previously transmitted to the word address generator WAG via the line 208. With respect to this byte location number it is assumed that it fits in the memory MEM 4 with respect to word length. If the data path is 32 bits wide, the said address may comprise, for example, 24 bits so that $2^{22}$ word locations of four bytes can be addressed. The remainder of the said word location then may contain information about the number of information bytes. The information on the line 201 may be received in the same manner as that applied via the information line INF 6, all the byte location numbers being enabled.

The location at which an information word is stored in the memory MEM 3 is fixed, but this does not apply to the memory MEM 4 which operates, for example, as a scratchpad memory: the words read out from the memory MEM 3 are stored in the memory MEM 4 now at one location, then at another location.

Thus the following lines are used for the following purposes:

| | |
|---|---|
| 201 | word location address in MEM 4 |
| 202 | rotation vector when writing (complement of line 214) |
| 204 | unincreased word location number in MEM 3 |
| 205 | word location number increased by 1 in MEM 3 |
| 206 | write/read signal |
| 208 | operand address in MEM 3 |
| 209 | number of bytes in information word |
| 210-211 | byte location number |
| 212-203 | enabling according to byte location number |
| 213 | choice between lowest and highest word location number |
| 214 | rotation vector when reading |
| 215-217 | operand address in MEM 3 |

In the "write" mode, information transfer is effected in the reverse direction. Initially the control device CONTR via the line 206 transmits a write instruction signal (i.e. "read" in the memory MEM 4) to the driving device DRI 6, the shift controls SC 1 and SC 2 and the driving device DRI 9. Furthermore the number of the word location at which the operand address for the memory MEM 3 is stored is transmitted via the line 201. This information word is read out and appears on the line INF 7 via which is reaches the rotator SROT, however, this rotator has not yet been actuated. Via a branch line 217 the said information word is applied to the word address generator WAG; the latter processes the said operand address in the same manner as described above with respect to that which had reached the word address generator WAG via the line 208. Subsequently the control device CONTR transmits a second word address via the line 201 to the memory MEM 4. The two addresses applied via the line 201 may have a simple relationship, for example in that they always differ by one in the abovedescribed manner. The rotator SROT now is in the actuated condition and transmits the information, which it may or may not have rotated under the control of a signal from the rotation control RC applied via the line 202. Rotation, if any, is in the direction opposite to that effected by the rotator LROT when it receives the same information. Furthermore the entire arrangement (SC 1, SEL 2, lines 212, 213) operates in the same manner as in the abovedescribed "read" operation, except that writing now is performed in the memory MEM 3 and hence the information is applied via the line INF 4. Consequently the read amplifiers of the device DRI 5 are inoperative but on the other hand the device DRI 4 now may include write amplifiers. As an alternative, in both operations "read" and "write" the addresses may be supplied by the device CONTR.

FIG. 6 is a more elaborate block diagram of the memory MEM 3 of FIG. 2. For the case of four byte locations per word location the circuit comprises eight modules BY 00 ... 03 and BY 10 ... 13 with associated read amplifiers DRI 50 ... 53, that is one per two modules, write amplifiers DRI 40 ... 43, decoders DEC 00 ... 03 and DEC 10 ... 13, and four address registers ADREG 00, 01, 10, 11. The circuit further comprises a word address generator WAG 2, eight information terminals K0 ... 7, eight control terminals K 8 ... 15 and an address input terminal K 16. The elements WAG, DRI 4 and DRI 6 of FIG. 2 are differently implemented in the circuit of FIG. 6.

Via the terminal K 16 the operand address (line 208 of FIG. 2) reaches the word address generator WAG 2. The word location number and the word location number increased by 1 appear on lines 204 and 205 respectively and are stored in the address registers ADREG 00, 11 and in address registers ADREG 01, 10 respectively. The modules BY00 ... 03 contain the even-numbered word locations and the modules BY10 ... 13 contain the odd-numbered word locations. The word location numbers can be decoded by the decoders DEC 00 ... 03 and DEC 10 ... 13 respectively. An information byte to be written in can always be received at the terminals K4 ... 7 of the write amplifiers DRI 40 ... 43. Via a line 218 the address generator WAG 2 supplies to the write amplifiers DRI 40 ... 43 a bit which indicates whether the unincreased word location number is even or odd, and furthermore the information from the elements SC 1 and SEL 2 is applied to the terminals K 12 ... 15 of these write amplifiers (in FIG. 2 this is effected via the lines 212 and 213). If the said last bit is a 0, the unincreased word location number is contained in the modules BY 00 ... 03 (ADREG 00) and the word location number increased by 1 is contained in the modules BY 10 ... 13 (ADREG 10). If the said last bit is a 1, the address registers ADREG 01 and 11 are concerned. The parallel arrangement greatly simplifies the selection at two different word locations. In addition, the modules By 00 ... 03 and BY 10 ... 13 may be in the form of word-organized memories; as is known, in word-organized memories selection is comparatively simple. All or some of the modules of the set BY 00 ... 03 may be combined to form one or more super-modules. Similarly the modules BY 00 ... 03 may be composed of sub-modules. The same applies to the modules BY 10 ... 13. The combinations between the signals on the line 218 and at the terminals K 12 ... 15 are combined by means of known logic circuits to generate the signals of the abovedescribed Table. Thus the correct modules are selected, i.e. never more than 1 from each pair BY 00/10, BY 01/11. etc. An additional signal appearing at the terminals K 8 ... 11 indicates either reading or writing (line 206 in FIG. 2). When reading, the information is produced via the read amplifiers DRI 50 ... 53 at the information terminals K0 ... 3. The highest word location number of the modules BY 03 and BY 13 never is actuated and hence these modules are not connected to the registers ADREG 01 and 10.

FIG. 4 shows modes of the memory system of FIG. 2. The second and third columns show the information bytes selected from the word location having an unincreased number and from that having an increased number respectively and indicated from A to D according to descending significance. The fifth column indicates how the information reaches the rototor, for example the rotator LROT of FIG. 2, in the form of information words. Column 4 shows the length of the information word to be read in bytes, the byte location number of the most significant byte in the memory MEM 3 and the byte location number of the most significant byte in the memory MEM 4 respectively. Columns 6 and 7 show the signals on lines 212 and 213 respectively in FIG. 2. Column 8 shows the rotation vector as the difference between the last two sub-columns of column 4. Column 9 shows the rotated information word and column 10 shows the signal on the lines 203 of FIG. 2. In the opposite direction, starting with column 10, FIG. 4 shows corresponding signals produced in the write operation (information is transferred to MEM 3). Negative rotation vectors correspond to positive ones, for example −3 corresponds to +1.

The invention also relates to other embodiments in which in the memory MEM 4 also two or even more than two word locations can jointly be addressed. An important embodiment mentioned hereinbefore is that in which the width of the data path and the length of the word locations are equal, the information being transferred according to bytes. This is of advantage when error correction information is to be included in the words, for in this case fixed bit locations in each byte information can be reserved for the error correction which arrive at fixed locations at the receiving end. Particularly if error correction is effected over the entire word length, only a comparatively small number of bit locations is required for this purpose. This is due to the fact that it is known that the number of bit locations required for error correction decreases at a rate far less than linearly with the length of the information word to be protected.

What is claimed is:

1. A memory system, comprising
 a first and a second memory, each of said memories including a plurality of memory elements arranged as separately addressable word locations;
 a data path connecting said memories;
 an instruction line for providing instruction signals to each of said memories;
 control means for generating said instruction signals for addressing word locations in said first memory, and for transferring information associated therewith along said data path; and selection means for selecting at least a portion of said transferred information for transfer to said second memory.

2. A memory system as defined in claim 1, wherein said control means simultaneously addresses two consecutive words in said first memory.

3. A memory system as defined in claim 2, wherein each word location comprises a predetermined member of successive byte locations, and wherein said control means addresses the first byte location in the first addressed word location and bytewise-in-parallel selects a predetermined number of bytes successively from said first byte location to the end of said first addressed word location, and then from the beginning of the second addressed word location, until the number of bytes corresponding to a complete word length is reached.

4. A memory system as defined in claim 3, futher comprising rotator means adapted for bytewise rotating the selected information under the control of said control means, whereby information outputs of the rotator means are connected in parallel to the data path line.

5. Memory system as defined in claim 4, wherein said first memory comprises first and second modules, said two addressed word locations being respectively situated in said first and said second modules.

6. A memory system comprising
a first and second memory having memory elements arranged as separately addressable word locations, each of said word locations comprising a predetermined member of byte locations, said first memory comprising first and second modules;
a data path interconnecting said memories;
an instruction line for each of said memories for transferring read/write signals to said memories;
control means for generating said read/write signals, and for addressing a first word location in a first one of said modules, and a first byte location in said first addressed word location; and
means for bytewise-in-parallel selecting information bytes for parallel transfer from said first module.

7. A memory system as defined in claim 6, wherein said data path has a width equal to the maximally transferable information for each word location.

8. A memory system as defined in claim 6, wherein said selected information bytes are selected progressively from said byte location to the end of said first addressed word location.

9. A memory system as defined in claim 8 wherein further information bytes are selected from a second word location in said second module by bytewise-in-parallel selecting progressively from the beginning of the second addressed word location up to at most a number of bytes corresponding to a complete word length information bytes for parallel transfer from said second module to said rotator means, said rotator means being adapted for bytewise rotating said information bytes under control of said control means connected thereto, and wherein said rotor means comprises information outputs for connection in parallel to said data path.

10. A memory system as defined in claim 6, further comprising rotator means connected to said control means for receiving said selected information bytes.

11. A memory system as defined in claim 6 wherein the two addressed word locations are numbered consecutively.

* * * * *